No. 646,251. Patented Mar. 27, 1900.
W. S. YOUNG.
DEHORNING OR BRANDING CHUTE.
(Application filed Sept. 22, 1899.)
(No Model.) 2 Sheets—Sheet 2.

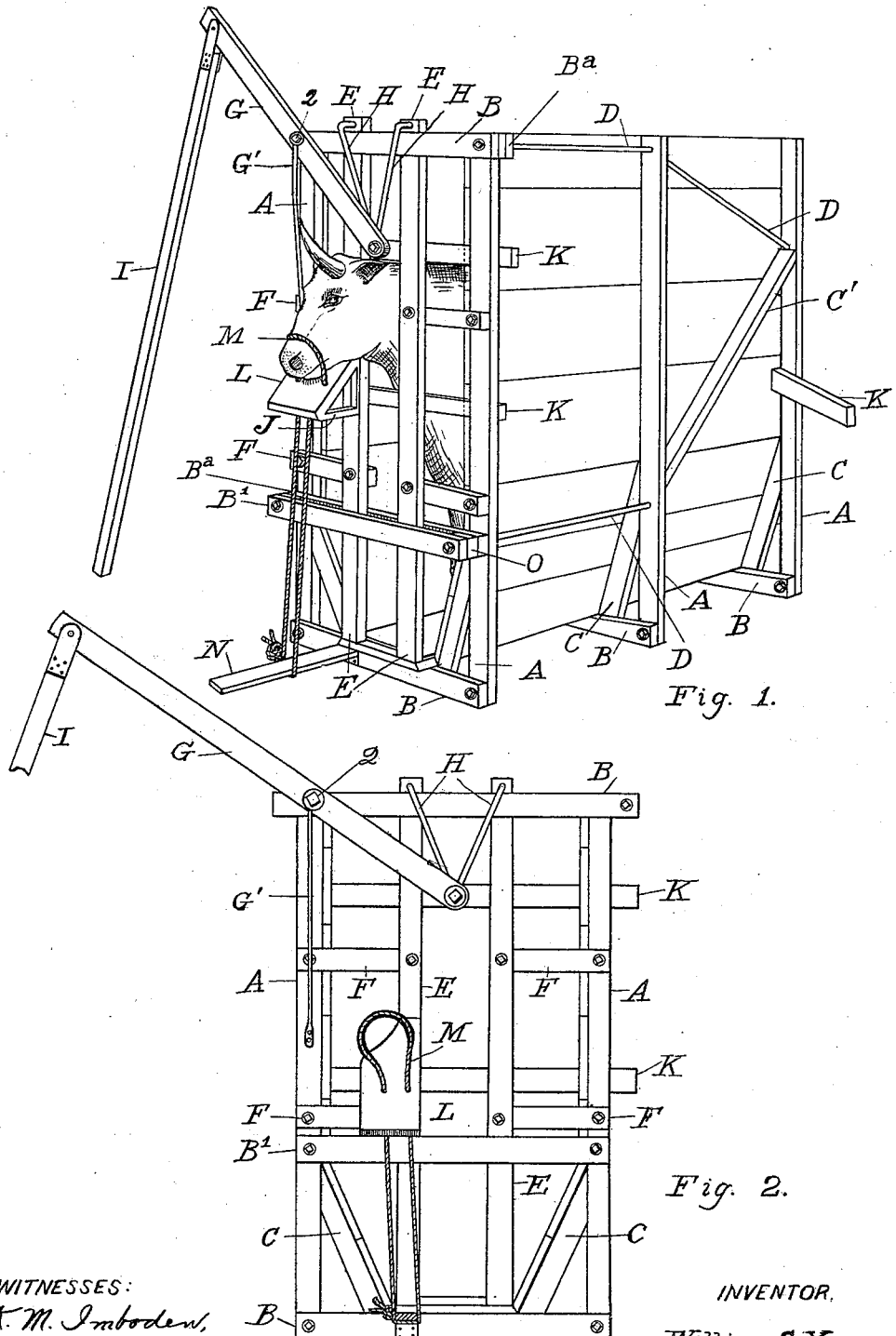

WITNESSES:
K. M. Imboden.
M. L. Lauge.

INVENTOR,
William S. Young.
by Higdon & Higdon,
HIS ATTORNEYS.

UNITED STATES PATENT OFFICE.

WILLIAM S. YOUNG, OF McPHERSON, KANSAS.

DEHORNING OR BRANDING CHUTE.

SPECIFICATION forming part of Letters Patent No. 646,251, dated March 27, 1900.

Application filed September 22, 1899. Serial No. 731,276. (No model.)

*To all whom it may concern:*

Be it known that I, WILLIAM S. YOUNG, a citizen of the United States, residing at McPherson, county of McPherson, State of Kansas, have invented certain new and useful Improvements in Dehorning or Branding Chutes, of which the following is a specification.

My invention relates to dehorning and branding chutes; and one object of my invention is to produce a dehorning and branding chute such as will confine the animal to be dehorned and branded secure, without danger to body or limb, excepting such as will be inflicted by the dehorning operation.

Another object I have in view in producing such is that it is so constructed that it can be moved from farm to farm and from ranch to ranch without taking it to pieces for that purpose.

Figure 3:
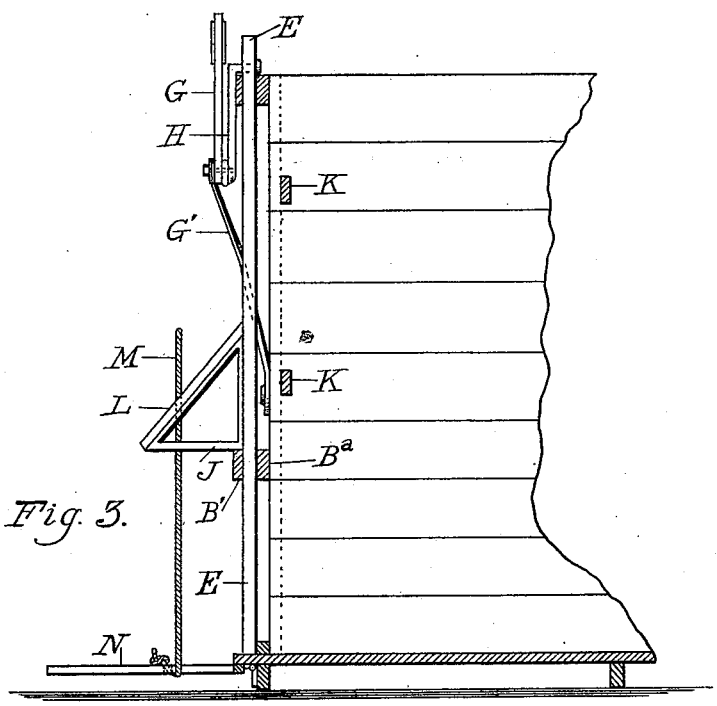
Figure 4:
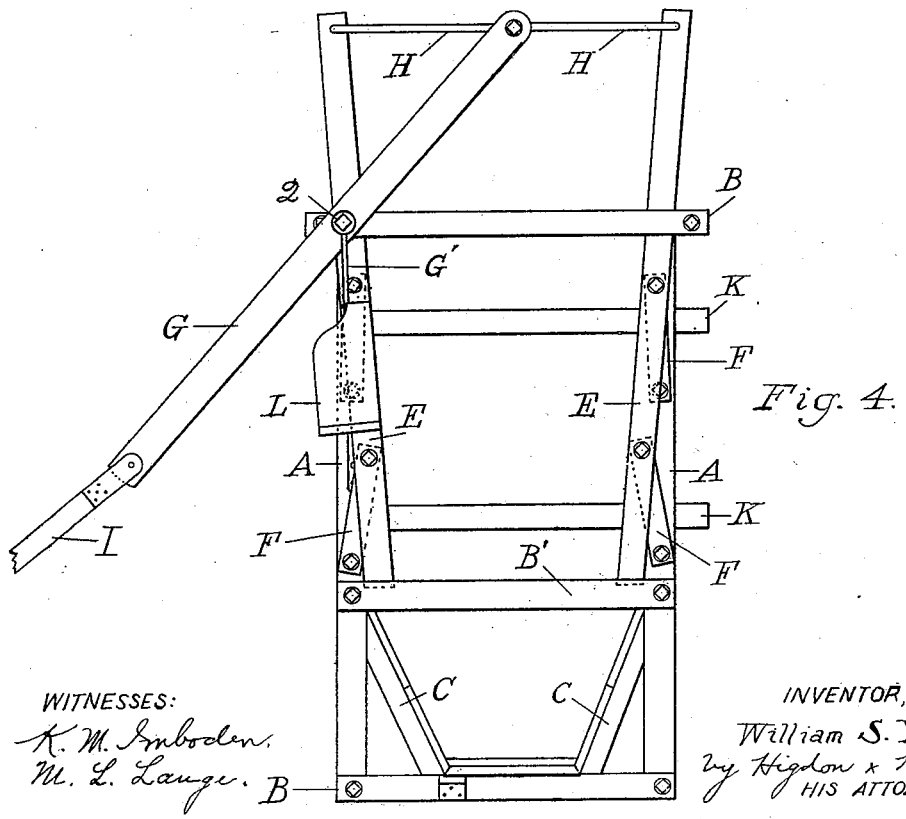

Figure 1 represents a perspective view of my invention with the animal to be dehorned in position ready for that purpose. Fig. 2 is a front elevation of the invention with the mechanism for confining the animal's head in position the same as in Fig. 1. Fig. 3 is a vertical longitudinal broken-away sectional view of the invention. Fig. 4 is a front elevation of the invention, showing the position of the mechanism ready for the animal to move out after withdrawing the two front transverse bars, which will be described farther on.

I will further proceed to describe my invention by referring to the drawings, with corresponding letters thereon, in which—

A represents vertical posts or stanchions of sufficient dimension to afford necessary strength to prevent the chute from spreading in the event that the animal should become unruly during the dehorning and branding operation. Horizontally across the lower and upper ends of the outer front stanchion are secured, by means of bolts, beams B and B$^a$, and also some twenty inches above the first-mentioned cross-beam B is another cross-beam (designated B$^a$, the same as the cross-beam at the top of the chute.) Near the bottom of the chute and on each side of the chute are a plurality of braces C, arranged at a suitable angle, so that the sides of the chute from the floor to the top of said braces diverge outwardly, then extend upward to the top of the chute, as shown. My object in making the floor of my chute and the diverged portions of the sides referred to more narrow and confined than the width proper of the chute is to confine the feet of the animal in a suitable narrow space to prevent lateral movement of the body when confined in the chute. I have also provided braces C and iron stay-bolts D to prevent longitudinal racking of the chute. On further observing the front elevation of my invention it will be seen that I have provided stanchions E E. It will be seen by referring to Fig. 4 that these stanchions E E have when in operation a vertical and lateral movement. To accomplish this movement, I have provided oscillating links F F, which are loosely pivoted to the movable stanchions E and to stationary stanchions A. To further accomplish this vertical movement, I have provided a lever or walking-beam G, which is also loosely pivoted at 2 to cross-beam B. In order that the bolt may be sufficiently strong to carry the walking-beam, I have provided a vertical brace or stay rod G', as shown, the upper end being provided with an eye through which the bolt at bearings 2 passes, the lower end secured to vertical stanchion A. Pivotally secured to the tops of said vertically and laterally moving stanchions E E and pivotally secured to the inner extreme end of walking-beam G are spreading-arms H. By means of these spreading-arms making the connections, as described, it will be observed and clearly seen by referring to Fig. 4 that by pulling down or raising handle I and by means of the oscillating links the vertical and lateral movement of said stanchions E E is accomplished with ease and precision. It will further be observed that I have made the spreading-arms each of sufficient length so that when the walking-beam is brought in the position shown at Fig. 4 the vertically and laterally movable stanchions are raised from their normal position, as seen in Figs. 1 and 2, and stand with their tops diverging outwardly. The object of this divergence of these stanchions is to afford ample space after the animal is branded and dehorned to move with ease out of the front of the dehorning-chute. It will further be observed by referring to Fig. 1 that I have provided three bars transversely of the chute. The object of these transverse bars is to more securely confine the animal while it is being branded and dehorned, and, further, secured to one of the vertically and laterally moving stanchions is a bracket L and J. The object of this bracket is when the animal is in proper position to form a rest, and to confine the animal's head on the rest I have provided a noose M to pass over the animal's nose downward through suitable openings in the bracket and secured to a pedal N, and, it will be further observed, to provide secure guideways for the movable stanchions I place a spacing-block O between $B^a$ and $B'$, then secure the whole to the vertical stanchion A, as can be seen in Fig. 1, thus forming elongated openings which hold the vertical movable stanchions in a secure position at any stage of their movement.

The *modus operandi* is as follows: The three transverse bars K are removed. The animal is then driven into the chute. A transverse bar is then placed in position at the rear of the animal. The movable stanchions are brought down in the position as shown in Figs. 1 and 2, when the other two stanchions at the front of the chute are placed in position, one over and the other under the animal's neck. Noose M is then placed over the animal's nose. A pressure is then put on pedal N, when the animal is secured. The branding-iron is then applied and the brute dehorned. When lever I is relaxed from its bracing attitude, walking-beam G is pulled down in a reverse position, the two first transverse bars K removed, when the animal will step out of the front of the chute and another animal is brought forward, &c.

I claim as my invention and desire to secure by Letters Patent—

1. In a dehorning or branding chute, the combination of the main frame, vertical stanchions set in slideways in said frame, pivoted links connecting said stanchions with the frame, an operating-lever fulcrumed on the frame, connecting-rods pivoted to the end of said lever and extending to said stanchions to impart thereto simultaneous vertical and lateral movement, substantially as set forth.

2. In a dehorning or branding chute, the combination of a main frame, laterally and vertically moving stanchions pivotally linked to said frame, removable cross-bars extending transversely of said stanchions, an inclined head-rest secured on one of said stanchions, and an adjustable loop extending vertically through openings in said head-rest to a foot-treadle, substantially as set forth.

In testimony whereof I affix my signature in the presence of two witnesses.

WILLIAM S. YOUNG.

Witnesses:
   J. W. BOLING,
   M. L. LANGE.